No. 712,489. Patented Nov. 4, 1902.
J. L. BLANTON.
FERTILIZER DROPPER.
(Application filed Feb. 21, 1902.)

(No Model.) 2 Sheets—Sheet 1.

J. L. Blanton, Inventor

Witnesses

No. 712,489. Patented Nov. 4, 1902.
J. L. BLANTON.
FERTILIZER DROPPER.
(Application filed Feb. 21, 1902.)
(No Model.) 2 Sheets—Sheet 2.
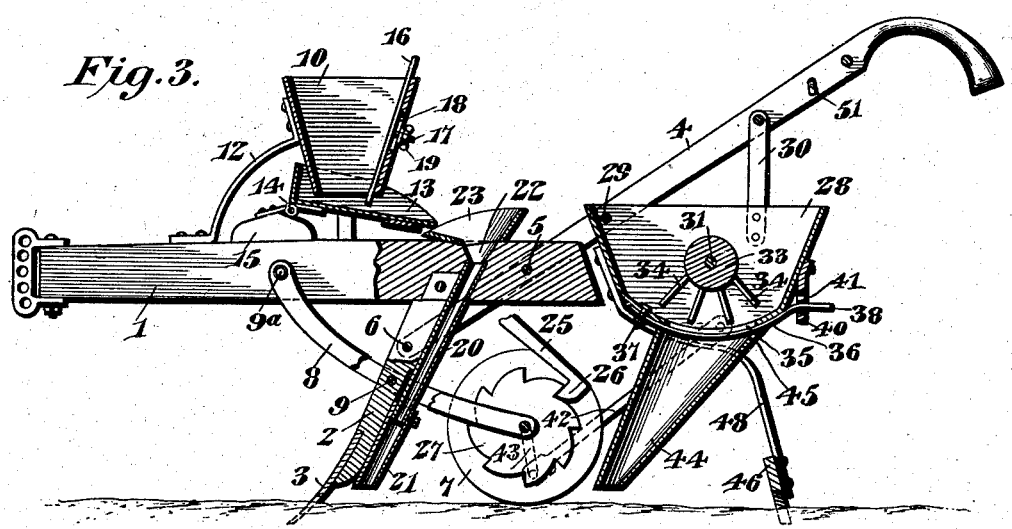
Witnesses
Jas. K. McCathran
H. J. Shepard
J. L. Blanton, Inventor
By E. G. Siggers
Attorney

UNITED STATES PATENT OFFICE.

JACOB L. BLANTON, OF SHARON, NORTH CAROLINA, ASSIGNOR OF TWO-THIRDS TO ROBERT L. SHORT AND JOHN H. HURT, OF CHERRYVILLE, NORTH CAROLINA.

FERTILIZER-DROPPER.

SPECIFICATION forming part of Letters Patent No. 712,489, dated November 4, 1902.

Application filed February 21, 1902. Serial No. 95,099. (No model.)

*To all whom it may concern:*

Be it known that I, JACOB L. BLANTON, a citizen of the United States, residing at Sharon, in the county of Cleveland and State of North Carolina, have invented a new and useful Fertilizer-Dropper, of which the following is a specification.

This invention relates to fertilizer-droppers, and is designed to provide an improved device of this character and particularly to render the fertilizer-dropping apparatus inoperative during a rearward movement of the implement, particularly when turning at the end of a field.

It is furthermore designed to provide improvements in the means for conducting fertilizer from the main supply-hopper to the chute or tube for leading the fertilizer to the ground, so as to prevent scattering and loss of the fertilizer in its passage from the hopper to the tube or chute.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

Figure 1:
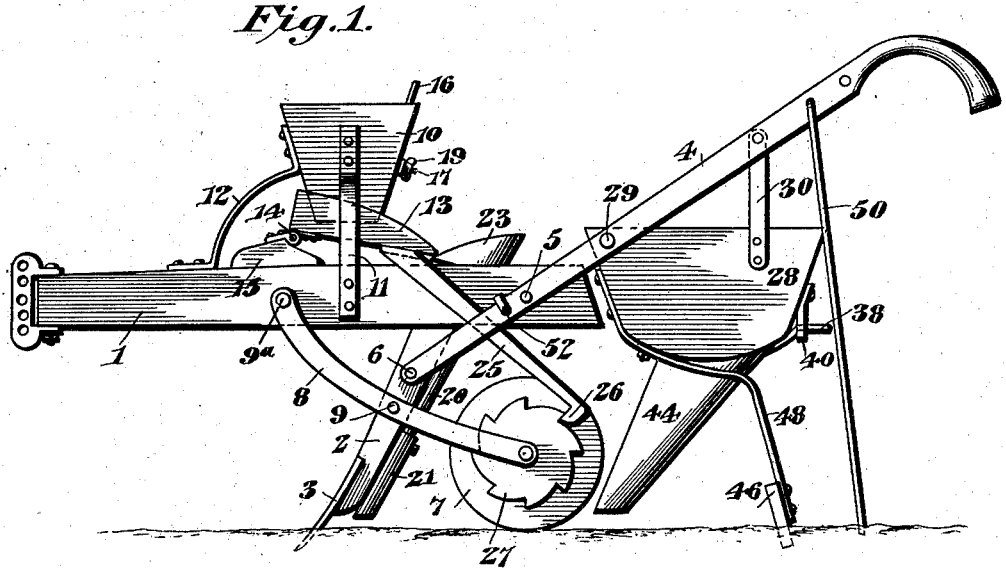
Figure 2:
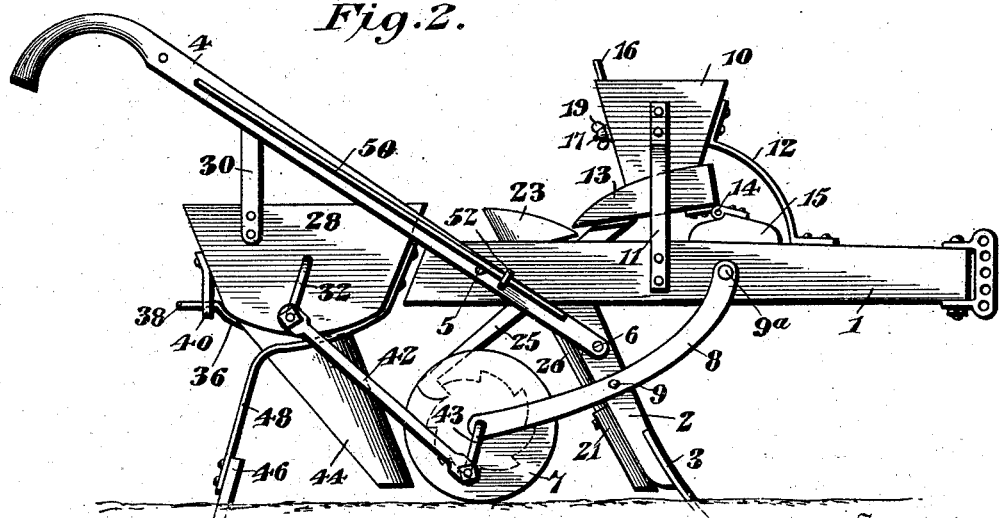

In the drawings, Figure 1 is a side elevation of a combined fertilizer-dropper and seed-planter constructed and arranged in accordance with the present invention. Fig. 2 is a similar view of the opposite side of the implement. Fig. 3 is a longitudinal sectional view thereof. Fig. 4 is a top plan view. Fig. 5 is a detail rear view.

Like characters of reference designate corresponding parts in all the figures of the drawings.

Referring to the accompanying drawings, 1 designates an ordinary plow-beam, from the rear portion of which depends a suitable standard 2, having a furrow-opener 3, carried at the lower end thereof. Ordinary plow-handles 4 are secured to the rear end of this beam by means of a suitable fastening 5, and the lower forward ends of the handles are also connected to the standard by the fastening 6. A supporting-wheel 7 is tracked in rear of the standard 2 and is journaled in the lower rear ends of a pair of hanger-arms 8, which are connected intermediately to the standard by means of the fastening 9 and have their forward ends connected to the beam in front of the standard, as indicated at $9^a$, whereby besides supporting the wheel 7 the hangers also form braces between the standard and the beam.

In front of the standard and disposed above the beam is a fertilizer-hopper 10, which is supported in an elevated position by means of opposite side arms 11 rising from the beam and a front arm 12, the bottom of the hopper being open, as clearly indicated in Fig. 3, and terminated short of the top of the beam. Beneath the hopper and embracing the lower end thereof is a rocking shoe 13, the forward end of which is provided with a hinged connection 14, with a block 15 secured to the top of the beam, so as to elevate the front end of the shoe and thereby incline the latter downwardly and rearwardly. Within the hopper and fitted against the back thereof is a vertically-adjustable feed-slide 16, (best shown in Fig. 3 of the drawings,) said slide being provided with a screw-threaded pin or stem 17, working in a vertical slot 18 in the back of the hopper and having a winged nut 19, whereby the slide may be held at any vertical adjustment. The purpose of this slide is to vary the size of the opening between the lower end of the slide and the bottom of the shoe, so as to feed more or less fertilizer, as may be desired.

In rear of the standard there is a distributer-tube 20, which lies against the back of the standard and pierces the beam, the lower end of the tube being provided with an endwise-adjustable lower section 21. The top of the beam is provided with a flared opening 22, communicating with the upper end of the tube 20, and fitted to this opening is a receiving-hopper 23, the forward end portion 24 of which is projected to underlie the rear free end of the rocking shoe 13, so as to receive the fertilizer therefrom and direct the same into the distributer-tube.

For rocking the shoe there is provided a tappet-arm 25, which is connected to the bottom of the free end of the shoe and is inclined downwardly and rearwardly between the beam and the adjacent handle, the lower free end of the arm being provided with a hook 26, which lies in frictional engagement with ratchet-teeth 27 upon the adjacent side of the wheel 7, so that during forward rotation of the wheel the hook or dog 26 will be alternately elevated and dropped by the teeth, and thereby impart a vertical rocking movement to the shoe 13, thereby to agitate the contents of the fertilizer-hopper and feed the same from the hopper 10 to the hopper 23 and thence through the feed-tube 20 into the bottom of the furrow and immediately in rear of the furrow-opener 3.

It is preferred to have the ratchet-teeth 27 formed upon the periphery of a disk which is carried upon one side of the wheel 7, each tooth having an abrupt shoulder and a rounded or inclined face leading from the outer end of the shoulder to the inner end of the abrupt shoulder of the next adjacent tooth, whereby the hook 26 of the tappet-arm 25 will readily ride over the rounded or inclined faces of the teeth when the implement is moving in a forward direction, but will drop back of the adjacent abrupt shoulder of one of the teeth should the implement be moved rearwardly, thereby to effectively lock the wheel and prevent dropping of the contents of the two hoppers.

A seed-hopper 28 is disposed between the handles 4 and in rear of the beam, the forward upper end of the hopper being connected to the handles by means of a removable cross-bar 29, piercing the opposite sides of the hopper and the handles, and the rear end of the hopper being supported by suitable hangers or brackets 30, which depend from the handles. Within this hopper is a rocking stirrer or agitator comprising a rock-shaft 31, journaled in the opposite sides of the hopper and having one end projected externally and formed into a crank 32. Upon the intermediate portion of this shaft and movable therewith is a sleeve 33, which is provided with a plurality of pendent substantially radial fingers or projections 34 to work over the bottom of the hopper and stir or agitate the contents thereof. In the bottom of the hopper and alined with the fingers 34 is a longitudinal slot or feed-opening 35, the size of which may be controlled by means of a cut-off lever 36, which is disposed upon the outer side of the bottom with its forward end pivoted thereto, as indicated at 37, the rear end of the lever being projected into a handle 38, which is received in a guide-slot formed in the bracket 40, which is secured to the rear end of the hopper, the lower edge of the slot being provided with ratchet-teeth 41 to form a rack with which the handle coöperates, so as to lock the cut-off in any adjusted position. It will here be noted that the handle of the cut-off is in convenient reach of the operator when standing at the handles and may be readily adjusted by the foot, and therefore does not require the operator to let go of the handles to adjust the cut-off. The stirrer or agitator is operated from the supporting-wheel 7 by means of a link or connecting-rod 42, which is connected to the crank 32 and also to a crank 43, provided at one end of the axle or journal of the wheel 7. A suitable spout 44 depends from the bottom of the hopper and embraces the feed-opening therein, so as to receive the seed, said spout being inclined forwardly and having its lower open end disposed adjacent to the rear side of the wheel 7 and near the surface of the ground, so as to prevent scattering of the seed and effectually direct the latter into the furrow. As best indicated in Fig. 5, it will be noted that the back of the spout is provided with a transverse slot 45 to accommodate the cut-off 36.

For returning the loosened earth into the furrow, so as to cover the seed, there is provided a coverer blade or plate 46, disposed transversely in rear of the spout and having an inverted-V-shaped notch 47 in its lower edge, so as to span the furrow-opening, and thereby form a hill over said furrow. This coverer is carried by the seed-hopper through the medium of a pair of spring arms or straps 48, which conform to the bottom of the hopper and have their upper ends connected to the front of the hopper, as indicated at 49, said arms or straps lying at opposite sides of the spout.

In order that the implement may be supported in an upright position without the aid of an operator, there is provided a pair of adjustable leg standards or props 50 in the form of metal rods, which have their upper ends pivotally connected to the upper rear portions of the handles 4, as indicated at 51, and are of a length to have their lower ends rest upon the ground at opposite sides of the implement when dropped into a substantially vertical position, as best illustrated in Fig. 1 of the drawings. When not in use, the props are swung upwardly and forwardly alongside of the respective handle members, as illustrated in Fig. 2, and engaged with suitable supports, preferably in the form of hooks 52, carried by the handle members, whereby the lower ends of the props may be held in an elevated position out of engagement with the ground when the implement is in use.

From the foregoing description it will be noted that the two hoppers are located adjacent to and at opposite sides of the supporting-wheel, so as to balance the implement, and thereby to facilitate the handling thereof. Moreover, the feed mechanisms of the two hoppers are simultaneously operated from the same wheel and are also locked, so as to prevent dropping of the fertilizer and seed when the implement is being turned at the end of a furrow in order that there may be no loss of material. Also the implement may be propped in an upright position when left standing over night or whenever the operator may desire to leave the implement for a short time. All of the parts of the device are in compact relation and are also in position for convenient access, whereby repairs are facilitated, and in every respect the implement presents a strong and durable structure.

Although the seed-hopper 28 and the coverer 46 have been shown and described in the present application for patent, no claim has been made thereto; but the right is reserved to present these features in a new application at some subsequent date.

What I claim is—

The combination with a beam, and a supporting-wheel therefor, of a hopper supported upon the beam, a feed device for the hopper, a ratchet-disk carried concentrically by one face of the wheel, each tooth of the disk having an abrupt face or shoulder and a rounded or inclined face leading from the outer end of the shoulder to the inner end of the abrupt shoulder of the next adjacent tooth, a tappet-arm connected to the feed device, and a ratchet-dog carried by the free portion of the arm and provided with a rounded or inclined face working over the inclined faces of the ratchet-teeth, and also having an abrupt shoulder for engagement with any of the abrupt shoulders of the ratchet-teeth to prevent rearward rotation of the wheel and thereby prevent operation of the feed device.

In testimony that I claim the foregoing as my own I have hereto affixed my signature in the presence of two witnesses.

JACOB L. BLANTON.

Witnesses:
M. J. WEATHERS,
L. N. WEATHERS.